United States Patent
Kinoshita et al.

(10) Patent No.: US 7,141,309 B2
(45) Date of Patent: Nov. 28, 2006

(54) HIGH THERMAL CONDUCTIVE MATERIAL HAVING HIGH THERMAL CONDUCTIVITY AND PROCESS FOR PRODUCING THE SAME

(75) Inventors: Toshiharu Kinoshita, Kakamigahara (JP); Tsuneo Komiyama, Toki (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/802,804

(22) Filed: Mar. 18, 2004

(65) Prior Publication Data

US 2004/0183232 A1 Sep. 23, 2004

(30) Foreign Application Priority Data

Mar. 18, 2003 (JP) .............................. 2003-073096

(51) Int. Cl.
C22C 29/06 (2006.01)
B28B 3/00 (2006.01)
C04B 35/653 (2006.01)

(52) U.S. Cl. ..................... 428/539.5; 264/332; 264/643

(58) Field of Classification Search .................. 419/27; 75/236; 264/643, 332; 428/539.5
See application file for complete search history.

(56) References Cited

U.S. PATENT DOCUMENTS 3,951,587 A * 4/1976 Alliegro et al. ............. 432/253
5,589,116 A * 12/1996 Kojima et al. .............. 264/628
5,851,941 A * 12/1998 Hanzawa ..................... 501/88
6,162,543 A * 12/2000 Dubots et al. ............... 428/408
6,503,572 B1 * 1/2003 Waggoner et al. .......... 427/431
6,737,168 B1 * 5/2004 Yamagata et al. ........... 428/446
6,800,182 B1 * 10/2004 Mitsui et al. ........... 204/298.13

FOREIGN PATENT DOCUMENTS

| JP | 2001019552 | * | 1/2001 |
| JP | 2001-053203 | | 2/2001 |
| JP | 2001-158680 | | 6/2001 |
| JP | 2002-275556 | | 9/2002 |
| WO | 200107377 A1 | * | 2/2001 |

* cited by examiner

Primary Examiner—Ngoclan T. Mai
(74) Attorney, Agent, or Firm—Steptoe & Johnson LLP

(57) ABSTRACT

A high thermal conductive material includes substantially silicon carbide and metal silicon, and preferably is formed by impregnating the space between the bonded silicon carbide crystals with the metal silicon. The production process comprises adding an organic binder and a dispersant or a binder having a dispersing effect to a silicon carbide powder to obtain a mixture, forming the mixture by cast forming or pressure forming to obtain a formed product, treating the formed product with heat at 2,100–2,500° C. for 1–5 hours to obtain a base material, impregnating the base material with an organic resin, treating the base material with heat, and impregnating the base material with metal silicon at 1,450–1,800° C. under reduced pressure. The high thermal conductive material exhibits not only properties that satisfy the balance between the coefficient of thermal expansion and the coefficient of thermal conductivity required for actual electronic components (including semiconductor devices) and the like, but also high thermal conductivity.

20 Claims, No Drawings

HIGH THERMAL CONDUCTIVE MATERIAL HAVING HIGH THERMAL CONDUCTIVITY AND PROCESS FOR PRODUCING THE SAME

BACKGROUND OF THE INVENTION

1. Field of the Invention

The present invention relates to a high thermal conductive material having high thermal conductivity and a process for producing the same.

2. Description of Background Art

In recent years, electronic devices containing many semiconductor elements have rapidly become common. Due to the development of microfabrication technology, the degree of integration of semiconductor integrated circuits have further increased. Also, the speed and output of the circuits have increased. To efficiently actuate the electronic devices which incorporate the semiconductor elements, it is important to appropriately maintain the temperature of the elements. Therefore, efficient measures for cooling or radiating heat are indispensable.

A high thermal conductive material plays an important role in effectively discharging heat generated in the semiconductor elements and preventing a decrease in performance and reliability of the semiconductor elements.

As a constituent for the high thermal conductive material, a metal with good thermal conductivity such as copper or aluminum has been conventionally used.

At present, an IC chip such as a CPU or memory is designed to be driven with low power to achieve low power consumption. However, as the semiconductor elements are highly integrated and the area for forming the elements is enlarged, the size of the IC chip tends to increase.

To discharge heat efficiently, it is necessary to bond the high thermal conductive material to the elements with high accuracy.

As the size of the IC chip increases, stress generated by the difference in thermal expansion between a semiconductor substrate (a silicon substrate or GaAs substrate) and the high thermal conductive material increases. This may cause a decrease in accuracy in bonding the high thermal conductive material to the IC chip, detachment of the high thermal conductive material from the IC chip, or mechanical destruction of the high thermal conductive material.

Therefore, as the constituent for the high thermal conductive material, a material having a coefficient of thermal expansion almost the same as that of silicon (Si) or GaAs which is the semiconductor substrate and also having high thermal conductivity must be selected.

Various embodiments for improving the high thermal conductive material have been reported. For instance, it has been known to use Cu (copper)-W (tungsten), aluminum nitride (AlN), or Al (aluminum)-SiC as the high thermal conductive material.

In particular, Cu—W is a composite material utilizing the combination of high thermal conductivity of W and high thermal conductivity of Cu. Since this material can be mechanically processed with ease, Cu—W can be formed into a miniaturized product with a complicated shape and is suitable as the high thermal conductive material for a semiconductor device.

AlN is a material having high electrical insulation properties and a low dielectric constant. AlN can be subjected to various metallization processes and can exhibit well-balanced thermal conductivity and thermal expansibility. Since this material has a coefficient of thermal expansion almost the same as that of Si, AlN is suitable for a semiconductor device in which a silicon substrate is used as the semiconductor substrate.

Al—SiC has high thermal conductivity and can be formed by near net shape forming so that a lid shape or the like of IC components can be comparatively simplified. Therefore, Al—SiC is suitable as the high thermal conductive material for a semiconductor device.

However, with the development of an advanced information society, a high thermal conductive material having low thermal expansibility closer to that of a silicon chip, as compared with the above-described Cu—W and Al—SiC, and having thermal conductivity higher than that of AlN has been demanded, to deal with a further increase in performance of the semiconductor elements such as an increase in the output of laser diodes as transmission media in the advanced information society and an increase in the degree of integration, speed, and performance of LSIs.

SUMMARY OF THE INVENTION

The present invention has been completed in view of the above problems of the related art. An object of the present invention is to provide a high thermal conductive material exhibiting not only properties that satisfy the balance between the coefficient of thermal expansion and the coefficient of thermal conductivity required for actual electronic components (including semiconductor devices) and the like, but also high thermal conductivity, and a process for producing such a high thermal conductive material.

The present invention provides a high thermal conductive material comprising substantially silicon carbide and metal silicon. In the high thermal conductive material, preferably voids formed by bonding crystals of the silicon carbide are impregnated with the metal silicon. The voids is normally in a mesh structure. The high thermal conductive material (first type) preferably contains the metal silicon in an amount of 4–30 wt % and having a bulk specific gravity of 2.95–3.18 and a coefficient of thermal conductivity of 190 W/mK or more. In the high thermal conductive material (first type), preferably the silicon carbide consists essentially of α-SiC.

Further, in the present invention, the high thermal conductive material (second type) preferably contains the metal silicon in an amount of 4–20 wt % and having a bulk specific gravity of 3.05–3.18 and a coefficient of thermal conductivity of 230 W/mK or more.

Still furthermore, in the present invention, the high thermal conductive material (third type) preferably contains the metal silicon in an amount of 4–15 wt % and having a bulk specific gravity of 3.08–3.18 and a coefficient of thermal conductivity is 250 W/mK or more. In the high thermal conductive materials (second type and third type), preferably the silicon carbide consists essentially of α-SiC and β-SiC.

The high thermal conductive materials (first to third types) preferably have a coefficient of thermal expansion of $3 \times 10^{-6}$/K or less.

The present invention further provides a process for producing a high thermal conductive material first type), the process comprising adding an organic binder and a dispersant or a binder having a dispersing effect to a silicon carbide powder to obtain a mixture, forming the mixture by cast forming or pressure forming to obtain a formed product, treating the formed product with heat at 2,100–2,500° C. for 1–5 hours to obtain a base material, and impregnating the base material with the metal silicon at 1,450–1,800° C. under reduced pressure.

The present invention further provides a process for producing a high thermal conductive material (second type or third type), the process comprising adding an organic binder and a dispersant or a binder having a dispersing effect to a silicon carbide powder to obtain a mixture, forming the mixture by cast forming or pressure forming to obtain a formed product, treating the formed product with heat at 2,100–2,500° C. for 1–5 hours to obtain a base material, impregnating the base material with an organic resin, drying the base material, treating the base material with heat, and further impregnating the base material with the metal silicon at 1,450–1,800° C. under reduced pressure.

The present invention still further provides a process for producing a high thermal conductive material (second type or third type), wherein the base material is again treated with heat at 2,100–2,500° C. for 1–5 hours and then again impregnated with the metal silicon, after impregnating the base material with the metal silicon in the above process.

In the production process of the present invention, the base material is preferably treated with heat at 200–1,000° C. in a non-oxidizing atmosphere, after the base material is impregnated with the organic resin.

In the production process of the present invention, impregnation with the organic resin, drying, and heat treatment are preferably carried out at least once, and more preferably twice or three times.

In the production process of the present invention, the organic resin is preferably a phenolic resin.

In the production process of the present invention, the SiC powder preferably comprises 30–60 wt % of coarse SiC particles with an average particle size of 50–150 μm, 1–5 wt % of medium SiC particles with an average particle size of 5–50 μm, 1–5 wt % of medium SiC particles with an average particle size of 1–10 μm, and 30–60 wt % of fine SiC particles with an average particle size of 0.1–5 μm.

DETAILED DESCRIPTION OF THE INVENTION AND PREFERRED EMBODIMENT

The high thermal conductive material of the present invention comprises substantially silicon carbide and metal silicon, and preferably voids formed by bonding crystals of the silicon carbide are impregnated with the metal silicon. The voids is normally in a mesh structure. In the high thermal conductive material (first type), preferably the silicon carbide consists essentially of α-SiC. The high thermal conductive material (first type) preferably contains the metal silicon in an amount of 4–30 wt % and has a bulk specific gravity of 2.95–3.18 and a coefficient of thermal conductivity of 190 W/mK or more. The high thermal conductive material (first type) is referred to as "high thermal conductive material (1)".

In the present invention, another type of the high thermal conductive material (second type) preferably comprises the silicon carbide substantially consisting of α-SiC and β-Sic. The high thermal conductive material (second type) preferably contains the metal silicon in an amount of 4–20 wt %, and has a bulk specific gravity of 3.05–3.18 and a coefficient of thermal conductivity of 230 W/mK or more. The high thermal conductive material (second type) is referred to as "high thermal conductive material (2)".

The high thermal conductive material of the present invention not only has properties that satisfy the balance between the coefficient of thermal expansion and the coefficient of thermal conductivity required for actual electronic components (including semiconductor devices) and the like, but also has high thermal conductivity.

The high thermal conductive material of the present invention (high thermal conductive material (1)) in which the silicon carbide substantially consists of α-SiC (hexagonal or orthorhombic silicon carbide) contains the metal silicon in an amount of preferably 4–30 wt %, and more preferably 20–30 wt %.

Since the silicon carbide has a coefficient of thermal conductivity of about 300 W/mK, which is higher than the thermal conductivity of the metal silicon (140 W/mK), if the amount of the metal silicon is more than 30 wt %, the coefficient of thermal conductivity cannot reach 190 W/mK.

It is ideal that the amount of the metal silicon be less than 20 wt %. To achieve this, it is necessary to reduce the porosity of the base material.

However, there is actually cost-related difficulties in reducing the porosity to the extent that the amount of the metal silicon is less than 20 wt % in one step of forming the crystals of the silicon carbide into a mesh structure in which the crystals are bonded.

The high thermal conductive material (1) preferably has a bulk specific gravity of 2.95 or more.

If the bulk specific gravity is less than 2.95, the resulting sintered product (high thermal conductive material) has insufficient bulk specific gravity, that is, insufficient SiC content. This causes a reduction in the coefficient of thermal conductivity.

The high thermal conductive material of the present invention (high thermal conductive material (2)) in which the silicon carbide is substantially consists of α-SiC (hexagonal or orthorhombic silicon carbide) and a small amount of β-SiC (cubic silicon carbide) preferably contains metal silicon in an amount of 4–20 wt % for 100 wt % of the silicon carbide.

Since the silicon carbide has a coefficient of thermal conductivity of about 300 W/mK, which is higher than the thermal conductivity of the metal silicon (140 W/mK), if the amount of the metal silicon is more than 15 wt %, the coefficient of thermal conductivity cannot reach 230 W/mK.

It is ideal that the whole high thermal conductive material be formed from silicon carbide without using metal silicon. To achieve this, it is necessary to prepare a dense silicon carbide base material using a ultrafine powder raw material as a starting raw material. However, this method has a high cost for raw material and is not cost-effective.

The high thermal conductive material (2) preferably has a bulk specific gravity of 3.05 or more.

If the bulk specific gravity is less than 3.05, the resulting sintered product (high thermal conductive material) has insufficient bulk specific gravity, that is, insufficient SiC content. This causes a reduction in the coefficient of thermal conductivity.

When the coefficient of thermal conductivity of the high thermal conductive material (2) is 250 W/mK or more (in the case of the high thermal conductive material (3), i.e. third type), the bulk specific gravity is preferably 3.08 or more.

It is important for the high thermal conductive material of the present invention to have not only high thermal conductivity, but also low thermal expansibility. Specifically, the high thermal conductive materials (1)–(3) preferably have a coefficient of thermal expansion of $3 \times 10^{-6}$/K or less.

In one embodiment, the process for producing the high thermal conductive material of the present invention comprises adding an organic binder and a dispersant or a binder with a dispersing effect to a silicon carbide powder, forming the mixture by cast forming or pressure forming, treating the formed product with heat at 2,100–2,500° C. for 1–5 hours to obtain a base material, and impregnating the base material with metal silicon at 1,450–1,800° C. under reduced pressure.

In another embodiment, the process for producing the high thermal conductive material of the present invention comprises adding an organic binder and a dispersant or a binder having a dispersing effect to a silicon carbide powder, forming the mixture by cast forming or pressure forming, treating the formed product with heat at 2,100–2,500° C. for 1–5 hours to obtain a base material, impregnating the base material with an organic resin, treating the base material with heat, and impregnating the base material with metal silicon at 1,450–1,800° C. under reduced pressure.

The main feature of the production process of the present invention is that the base material in a mesh structure in which the crystals of the silicon carbide are bonded is impregnated with the organic resin and the base material is treated with heat, prior to impregnating the base material with the metal silicon, so that the voids in the base material as a precursor, formed in a mesh structure in which the crystals of the silicon carbide are bonded, are packed with porous carbon (C) generated from the organic resin.

According to this process, when the resulting base material is impregnated with the metal silicon at 1,450–1,800° C. under reduced pressure, the porous carbon (C) generated from the organic resin reacts with the metal silicon (Si) in the voids in the base material having a mesh structure in which the crystals of the silicon carbide are bonded to become SiC (silicon carbide). The voids are packed with SiC with an expanded volume. Therefore, the resulting high thermal conductive material can have an increased bulk specific gravity, that is, an increased silicon carbide content, and a significantly increased coefficient of thermal conductivity.

In the production process of the present invention, it is preferable to carry out heat treatment to promote the reaction of the organic resin with the metal silicon in the voids in the base material having a mesh structure in which the crystals of the silicon carbide are bonded, after impregnating the base material with the organic resin, so that the silicon carbide can be produced to a maximum extent.

When the organic resin is carbonized by heat treatment at 200–1,000° C. in a non-oxidizing atmosphere, the decomposed gas is generated in the voids in the base material having a mesh structure in which the crystals of the silicon carbide are bonded and is released from the pores. Accordingly, the porous carbon (C) having minute paths is generated and packed in the base material treated with heat.

In the production process of the present invention, impregnation with the organic resin and heat treatment are preferably carried out at least once, and more preferably twice or three times.

When an excess amount of the organic resin is packed in the voids in the base material having a mesh structure in which the crystals of the silicon carbide are bonded, closure of the pores, reduction of the pore size, or the like occurs in the voids. As a result, the metal silicon (Si) cannot be sufficiently distributed in the voids, resulting in insufficient production of silicon carbide. The bulk specific gravity of the resulting sintered product (high thermal conductive material) is thereby reduced.

In the production process of the present invention, the organic resin is preferably a phenolic resin.

Since the phenolic resin is a liquid, the resin can be homogeneously packed in the pores in the base material in a mesh structure in which the crystals of the silicon carbide are bonded. Moreover, since the resin has a high residual carbon content, a highly strong, glass-like carbon can be obtained by carbonizing the resin. Furthermore, since the resin is a heat-curable resin, the porous carbon (C) can be homogeneously secured to the voids in the base material having a mesh structure in which the crystals of the silicon carbide are bonded by impregnating the base material with the organic resin, followed by treating the base material with heat.

Although there are no specific limitations to the phenolic resin used in the present invention, a novolac resin to which hexamine is added is preferably used because of its high average molecular weight and high residual carbon content.

The silicon carbide powder used in the present invention comprises 30–60 wt % of coarse particles with an average particle size of 50–150 μm, 1–5 wt % of medium particles with an average particle size of 5–50 μm, 1–5 wt % of medium particles with an average particle size of 1–10 μm, and 30–60 wt % of fine particles with an average particle size of 0.1–5 μm.

If the amount of the coarse particles with an average particle size of 50–150 μm is less than 30 wt %, the packing density in the formed product is reduced and the amount of the coarse silicon carbide particles advantageous for thermal conduction decreases. The coefficient of thermal conductivity is thereby reduced.

If the amount of the coarse particles exceeds 60 wt %, fluidity of the slurry for cast forming or the powder for pressure forming decreases. The packing density in the formed product is thereby reduced.

Since the first medium particles with an average particle size of 5–50 μm are packed in the voids formed between the coarse particles and the fine particles, a higher density in the formed product can be obtained. If the amount of the first medium particles is less than 1 wt %, the silicon carbide particles are not sufficiently packed. This does not contribute to the increase in the packing density in the formed product. If the amount of the first medium particles exceeds 5 wt %, the voids between the silicon carbide particles are enlarged by an excess of the first medium particles. Therefore, the packing density in the formed product is reduced. The coefficient of thermal conductivity is thereby reduced.

In the present invention, the second medium particles with an average particle size of 1–10 μm can be packed in the voids formed by the coarse particles, fine particles, and first medium particles and can increase the packing density in the formed product. If the amount of the second medium particles is less than 1 wt %, the silicon carbide particles are not sufficiently packed. This does not contribute to an increase in the packing density in the formed product. If the amount of the second medium particles exceeds 5 wt %, the voids formed by the silicon carbide particles are enlarged by the excessive first medium particles. Therefore, the packing density in the formed product is reduced. The coefficient of thermal conductivity is thereby reduced.

In the present invention, if the amount of the fine particles with an average particle size of 0.1–5 μm is less than 30 wt %, since the packing density in the formed product is reduced and the silicon carbide atmosphere obtained by sublimating the fine powder during recrystallization is insufficient, necking between the silicon carbide particles cannot be sufficiently carried out. The coefficient of thermal conductivity is thereby reduced.

If the amount of the fine particles exceeds 60 wt %, the packing density during forming is reduced. The coefficient of thermal conductivity is thereby reduced.

EXAMPLES

The present invention is described below in more detail by examples. However, the present invention is not limited to the following examples.

Examples 1–7

A silicon carbide powder was formed from 48 wt % of coarse SiC particles with an average particle size of 100 μm, 3 wt % of first medium particles with an average particle size of 30 μm, 2 wt % of second medium particles with an average particle size of 2 μm, and 47 wt % of fine particles with an average particle size of 2 μm. An acrylic binder and a polycarboxylic acid-based dispersant were added to the powder to prepare a slurry. The slurry was dried using a spray dryer to obtain a granulated powder. The resulting granulated powder was formed using pressure forming with different forming pressures to obtain a formed product (Examples 1–5). Alternatively, the resulting slurry was formed using cast forming to obtain a formed product (Examples 6 and 7).

The resulting formed product was treated with heat (recrystallized) at 2,300° C. for three hours to obtain a base material as a recrystallized product (Examples 1 and 2). The resulting base material was vacuum-impregnated with an organic resin (a novolac-based phenolic resin to which 10 wt % of hexamine was added) in a vacuum desiccator for 30 minutes. Then, the base material after impregnation was removed from the vacuum desiccator. An excess amount of the resin on the surface of the base material was wiped off.

A polytetrafluoroethylene (Teflon™) sheet was laid on a metal dish. The base material after impregnation was placed on the sheet and retained in a dryer at 160° C. for one hour to cure the impregnated organic resin (Examples 3 and 6).

Impregnation with the phenolic resin, drying, and heat treatment were respectively repeated twice (Examples 4 and 7) or three times (Example 5) to obtain a base material.

The resulting base material after impregnation with the phenol was impregnated with metal silicon under reduced pressure at 1,500° C. to obtain a high thermal conductive material of Si—SiC. The porosity and bulk specific gravity of the high thermal conductive material were determined before impregnation with the metal silicon, and the bulk specific gravity of the high thermal conductive material was determined after impregnation with the metal silicon. The SiC content, metal Si content, and coefficients of thermal conductivity and thermal expansion at room temperature were evaluated for the obtained high thermal conductive material. The results are shown in Table 1.

The results of comparing the high thermal conductive material with conventional high thermal conductive materials with regard to the bulk specific gravity, coefficient of thermal conductivity, and coefficient of thermal expansion at room temperature are shown in Table 2.

Comparative Example

A product formed by pressure forming under pressure lower than in Example 1 was treated with heat (recrystallized) at 2,300° C. for three hours. The resulting base material was impregnated with metal silicon under reduced pressure at 1,500° C. to obtain a high thermal conductive material of Si—SiC. The same properties as in Examples were evaluated for the resulting high thermal conductive material. The results are shown in Table 1.

TABLE 1

| | Base material (Recrystallized SiC product) | | Phenolic resin | High thermal conductive material (Si—SiC material) | | | | |
|---|---|---|---|---|---|---|---|---|
| | Before impregnation with metal Si | | Number of | After impregnation with metal Si | | | | |
| | Bulk specific gravity (−) | Porosity (%) | impregnation and heat treatments (times) | Bulk specific gravity (−) | Coefficient of thermal conductivity (W/mK) | Coefficient of thermal expansion (×10⁻⁶) | Content SiC (wt %) | Si (wt %) |
| Example 1 | 2.26 | 29.6 | None | 2.95 | 190 | 2.8 | 70 | 30 |
| Example 2 | 2.58 | 19.8 | None | 3.04 | 234 | 2.8 | 80 | 20 |
| Example 3 | 2.58 | 19.8 | 1 | 3.08 | 253 | 2.8 | 85 | 15 |
| Example 4 | 2.58 | 19.8 | 2 | 3.14 | 265 | 2.9 | 92 | 8 |
| Example 5 | 2.58 | 19.8 | 3 | 3.18 | 278 | 2.9 | 96 | 4 |
| Example 6 | 2.68 | 16.5 | 1 | 3.14 | 268 | 2.8 | 92 | 8 |
| Example 7 | 2.68 | 16.5 | 2 | 3.18 | 282 | 2.9 | 96 | 4 |
| Comparative Example | 2.09 | 33.6 | None | 2.91 | 170 | 2.8 | 65 | 35 |

TABLE 2

| | High thermal conductive material | | |
|---|---|---|---|
| | Bulk specific Gravity (−) | Coefficient of thermal conductivity (W/mK) | Coefficient of thermal expansion (×10⁻⁶) |
| Example 5 | 3.18 | 278 | 2.9 |
| Comparative Example | 2.91 | 170 | 2.8 |
| Cu—W material | 16 | 230 | 8 |
| AlN material | 3.3 | 180 | 4.5 |
| Al—SiC material | 2.7 | 180 | 12 |

(Discussion)

In Examples 1–7, the base material in a mesh structure in which the crystals of the silicon carbide are bonded is impregnated with the organic resin and the base material is treated with heat, prior to impregnating the base material with the metal silicon, so that the voids in the base material are packed with porous carbon (C) generated from the organic resin. The carbon (C) is reacted with the metal silicon (Si) to become SiC (silicon carbide) which can be packed in the void.

Therefore, the resulting high thermal conductive material (Examples 1–7) can have an increased bulk specific gravity, that is, an increased silicon carbide content, and a significantly improved coefficient of thermal conductivity as compared with the high thermal conductive material of Comparative Example and those conventionally used (see Tables 1 and 2).

As described above, the high thermal conductive material of the present invention not only has properties that satisfy the balance between the coefficient of thermal expansion and the coefficient of thermal conductivity required for actual electronic components (including semiconductor devices) and the like, but also has high thermal conductivity. The production process of the present invention can provide such a high thermal conductive material.

What is claimed is:

1. A high thermal conductive material, comprising substantially silicon carbide and metal silicon wherein (1) voids formed by bonding crystals of the silicon carbide are impregnated with the metal silicon, (2) the metal silicon is contained in an amount of 4–30 wt % and (3) the high thermal conductive material has a bulk specific gravity of 2.95–3.05, a coefficient of thermal expansion of no more than $3\times10^{-6}$/K, and a coefficient of thermal conductivity of 190 W/mK or more.

2. The high thermal conductive material according to claim 1, wherein the silicon carbide consists essentially of α-SiC.

3. The high thermal conductive material comprising substantially silicon carbide and metal silicon wherein (1) voids formed by bonding crystals of the silicon carbide are impregnated with the metal silicon, (2) the metal silicon is contained in an amount of 4–20 wt % and (3) the high thermal conductive material has a bulk specific gravity of 3.05–3.18, a coefficient of thermal expansion of no more than $3\times10^{-6}$/K, and a coefficient of thermal conductivity of 230 W/mK or more.

4. The high thermal conductive material comprising substantially silicon carbide and metal silicon wherein (1) voids formed by bonding crystals of the silicon carbide are impregnated with the metal silicon, (2) the metal silicon is contained in an amount of 4–15 wt % and (3) the high thermal conductive material has a bulk specific gravity of 3.08–3.18, a coefficient of thermal expansion of no more than $3\times10^{-6}$/K, and a coefficient of thermal conductivity of 250 W/mK or more.

5. The high thermal conductive material according to claim 3, wherein the silicon carbide consists essentially of α-SiC and β-SiC.

6. The high thermal conductive material according to claim 4, wherein the silicon carbide consists essentially of α-SiC and β-SiC.

7. A process for producing the high thermal conductive material according to claim 1, which comprises:
adding an organic binder and a dispersant or a binder having a dispersing effect to a silicon carbide powder to obtain a mixture,
forming the mixture by cast forming or pressure forming to obtain a formed product,
treating the formed product with heat at 2,100–2,500° C. for 1–5 hours to obtain a base material, and
impregnating the base material with metal silicon at 1,450–1,800° C. under reduced pressure.

8. A process for producing the high thermal conductive material according to claim 3, which comprises:
adding an organic binder and a dispersant or a binder having a dispersing effect to a silicon carbide powder to obtain a mixture,
forming the mixture by cast forming or pressure forming to obtain a formed product,
treating the formed product with heat at 2,100–2,500° C. for 1–5 hours to obtain a base material,
impregnating the base material with an organic resin,
drying the base material,
treating the base material with heat, and
impregnating the base material with metal silicon at 1,450–1,800° C. under reduced pressure.

9. A process for producing the high thermal conductive material according to claim 4, which comprises:
adding an organic binder and a dispersant or a binder having a dispersing effect to a silicon carbide powder to obtain a mixture,
forming the mixture by cast forming or pressure forming to obtain a formed product,
treating the formed product with heat at 2,100–2,500° C. for 1–5 hours to obtain a base material,
impregnating the base material with an organic resin,
drying the base material,
treating the base material with heat,
impregnating the base material with metal silicon at 1,450–1,800° C. under reduced pressure,
treating the base material with heat at 2,100–2,500° C. for 1–5 hours, and
impregnating the base material with the metal silicon at 1,450–1,800° C. under reduced pressure.

10. The process for producing a high thermal conductive material according to claim 8, wherein the residual carbon content in the organic resin is 30 wt % or more.

11. The process for producing a high thermal conductive material according to claim 9, wherein the residual carbon content in the organic resin is 30 wt % or more.

12. The process for producing a high thermal conductive material according to claim 8, wherein the base material is treated with heat at 200–1,000° C. in a non-oxidizing atmosphere after being impregnated with the organic resin and dried.

13. The process for producing a high thermal conductive material according to claim 9, wherein the base material is treated with heat at 200–1,000° C. in a non-oxidizing atmosphere after being impregnated with the organic resin and dried.

14. The process for producing a high thermal conductive material according to claim 8, wherein impregnation with the organic resin, drying, and heat treatment are respectively carried out at least once.

15. The process for producing a high thermal conductive material according to claim 9, wherein impregnation with the organic resin, drying, and heat treatment are respectively carried out at least once.

16. The process for producing a high thermal conductive material according to claim 8, wherein the organic resin is a phenolic resin.

17. The process for producing a high thermal conductive material according to claim 9, wherein the organic resin is a phenolic resin.

18. A process for producing a high thermal conductive material comprising substantially silicon carbide and metal silicon, wherein (1) voids formed by bonding crystals of the silicon carbide are impregnated with the metal silicon, (2) the metal silicon is present in an amount of 4 to 30 wt. %, and (3) the high thermal conductive material has a bulk specific gravity of 2.95 to 3.05 and a coefficient of thermal conductivity of at least 190 W/mK, comprising adding an organic binder and a dispersant or a binder having a dispersing effect to a silicon carbide powder to obtain a mixture;

forming the mixture by cast forming or pressure forming to obtain a formed product;

treating the formed product with heat at 2,100° C. to 2,500° C. for 1 to 5 hours to obtain a base material; and impregnating the base material with metal silicon at 1,450° C. to 1,800° C. under reduced pressure, wherein the silicon carbide powder comprises 30–60 wt % of coarse particles with an average particle size of 50–150 μm, 1–5 wt % of medium particles with an average particle size of 5–50 μm, 1–5 wt % of medium particles with an average particle size of 1–10 μm, and 30–60 wt % of fine particles with an average particle size of 0.1–5 μm.

19. A process for producing a high thermal conductive material comprising substantially silicon carbide and metal silicon, wherein (1) voids formed by bonding crystals of the silicon carbide are impregnated with the metal silicon, (2) the metal silicon is present in an amount of 4 to 20 wt. %, and (3) the high thermal conductive material has a bulk specific gravity of 3.05 to 3.18 and a coefficient of thermal conductivity of at least 230 W/mK, comprising adding an organic binder and a dispersant or a binder having a dispersing effect to a silicon carbide powder to obtain a mixture;

forming the mixture by cast forming or pressure forming to obtain a formed product;

treating the formed product with heat at 2,100° C. to 2,500° C. for 1 to 5 hours to obtain a base material; and impregnating the base material with an organic resin;

drying the base material with heat; and impregnating the base material with metal silicon at 1,400° C. to 1,800° C. under reduced pressure, wherein the silicon carbide powder comprises 30–60 wt % of coarse particles with an average particle size of 50–150 μm, 1–5 wt % of medium particles with an average particle size of 5–50 μm, 1–5 wt % of medium particles with an average particle size of 1–10 μm, and 30–60 wt % of fine particles with an average particle size of 0.1–5 μm.

20. The process for producing a high thermal conductive material according to claim 9, wherein the silicon carbide powder comprises 30–60 wt % of coarse particles with an average particle size of 50–150 μm, 1–5 wt % of medium particles with an average particle size of 5–50 μm, 1–5 wt % of medium particles with an average particle size of 1–10 μm, and 30–60 wt % of fine particles with an average particle size of 0.1–5 μm.

* * * * *